(12) United States Patent
Chang et al.

(10) Patent No.: US 9,206,891 B2
(45) Date of Patent: Dec. 8, 2015

(54) SUPPORT STRUCTURE FOR A BALL SCREW

(71) Applicant: HIWIN TECHNOLOGIES CORP., Taichung (TW)

(72) Inventors: Lung-Yu Chang, Taichung (TW); Ying-Ju Lin, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 200 days.

(21) Appl. No.: 14/162,277

(22) Filed: Jan. 23, 2014

(65) Prior Publication Data

US 2015/0204428 A1    Jul. 23, 2015

(51) Int. Cl.
*F16H 25/24* (2006.01)
*F16H 25/20* (2006.01)

(52) U.S. Cl.
CPC .......... *F16H 25/24* (2013.01); *F16H 2025/204* (2013.01); *F16H 2025/2436* (2013.01); *Y10T 74/18648* (2015.01)

(58) Field of Classification Search
CPC .............. F16H 25/24; F16H 2025/204; F16H 2025/2436
USPC .................................. 74/89.23, 89.32, 89.33
See application file for complete search history.

(56) References Cited

U.S. PATENT DOCUMENTS

| | | | | |
|---|---|---|---|---|
| 2,398,941 | A * | 4/1946 | Jordan | B25B 1/125 269/181 |
| 3,665,782 | A * | 5/1972 | Loftus | B23Q 5/408 74/89.36 |
| 6,244,122 | B1 * | 6/2001 | Hsu | B23Q 5/408 74/89.23 |
| 6,344,718 | B1 * | 2/2002 | Nagai | B23Q 1/58 310/80 |
| 6,655,225 | B1 * | 12/2003 | Nagai | F16C 29/008 74/89.33 |
| 6,807,877 | B2 * | 10/2004 | Sato | B23Q 1/58 29/563 |
| 2011/0067518 | A1 * | 3/2011 | Park | B25J 9/102 74/490.04 |
| 2011/0174100 | A1 * | 7/2011 | Fukano | F16H 25/24 74/89.36 |
| 2012/0186374 | A1 * | 7/2012 | Schroeder | F16H 25/20 74/89.32 |

* cited by examiner

*Primary Examiner* — William Kelleher
*Assistant Examiner* — Emily Cheng
(74) *Attorney, Agent, or Firm* — Patent Office of Bang Shia

(57) ABSTRACT

A support structure for a ball screw includes a base, two pivot seats mounted on the base, a screw disposed between the two pivot seats, at least one guide rail fixed on the base, a first guide block fixed on the base and provided with a first slanting surface, a second guide block fixed on the base and provided with a second slanting surface, a support seat slidably mounted on the guide rails and located below the screw, a nut unit sleeved on the screw and slidably disposed on the guide rails, and a drive assembly fixed at the nut unit. The support structure for a ball screw has a simple structure, a low maintenance cost and a longer service life.

10 Claims, 9 Drawing Sheets

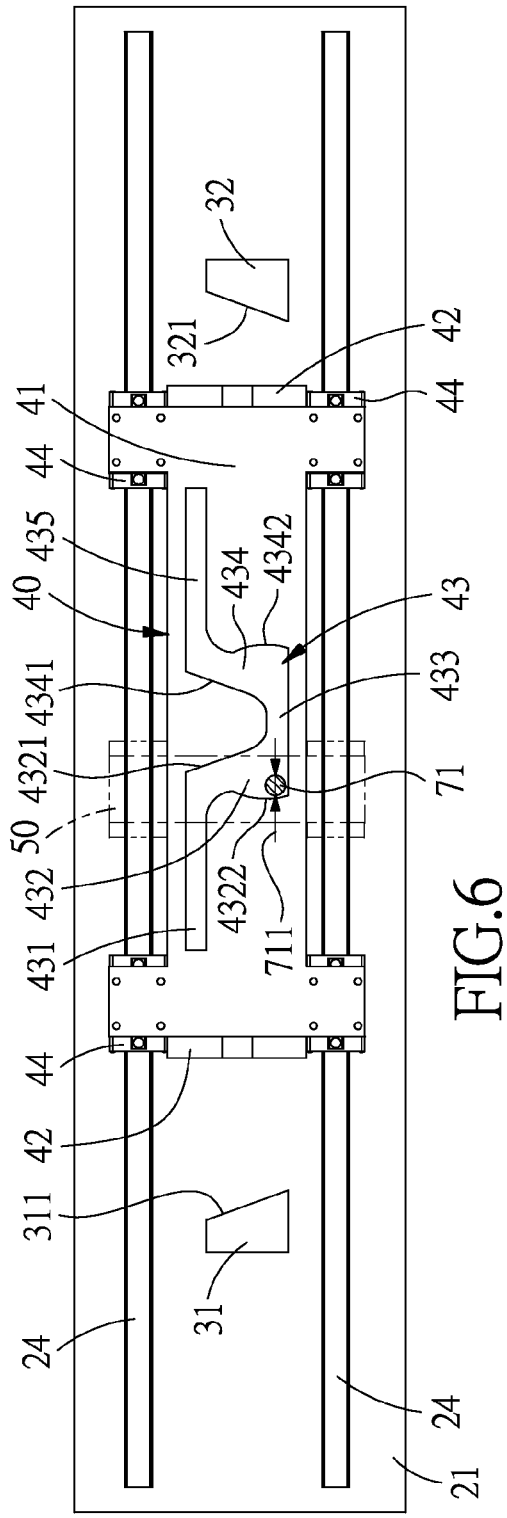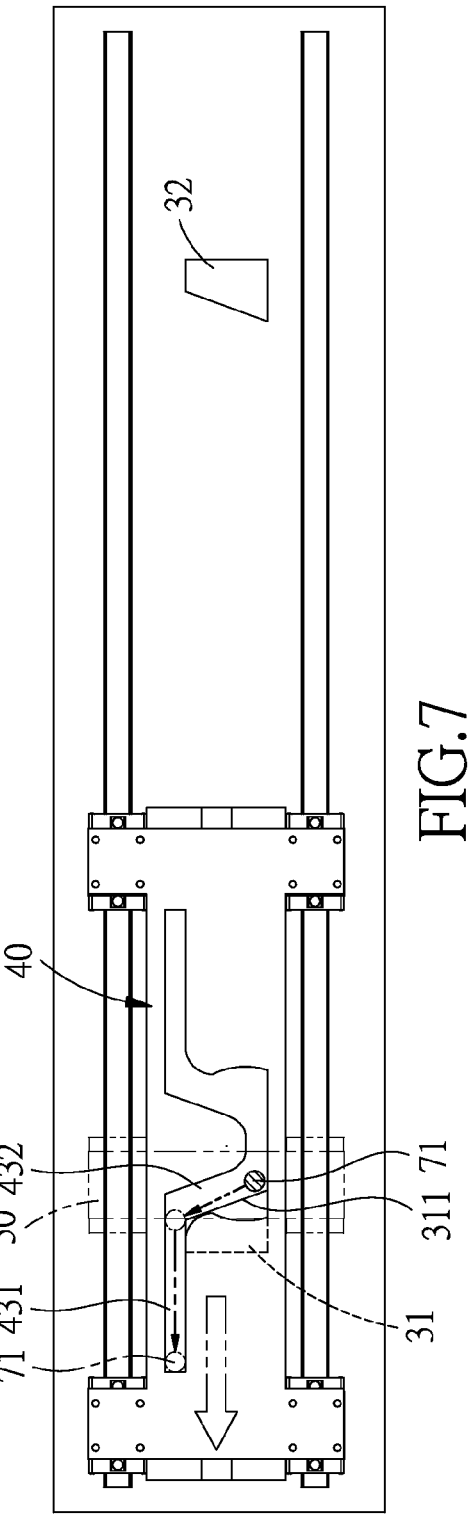

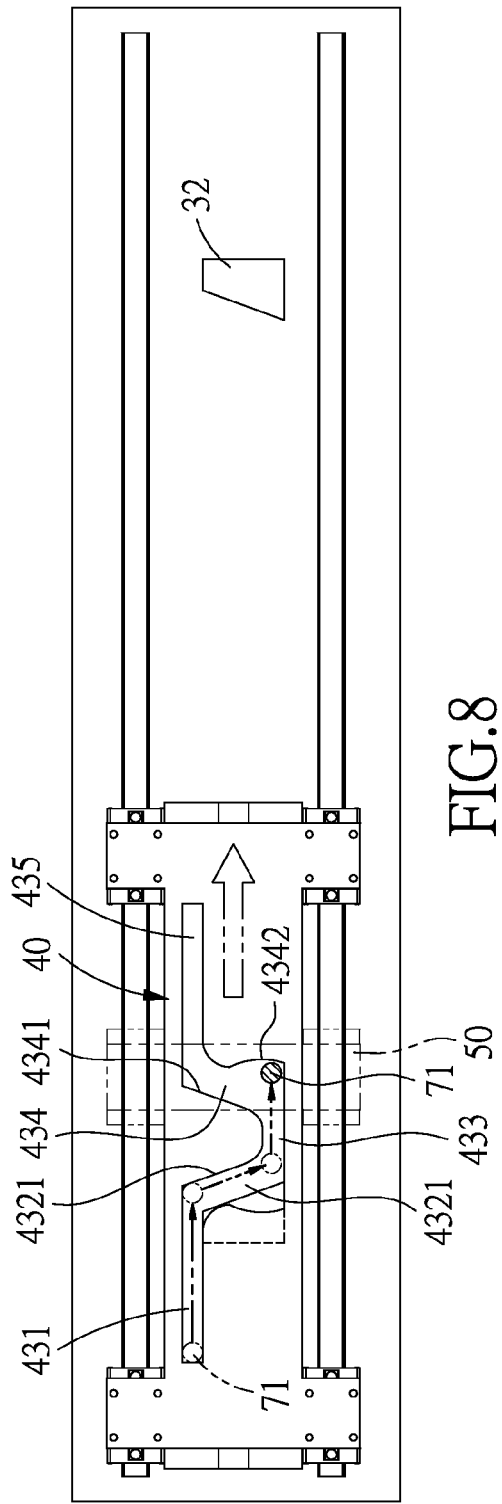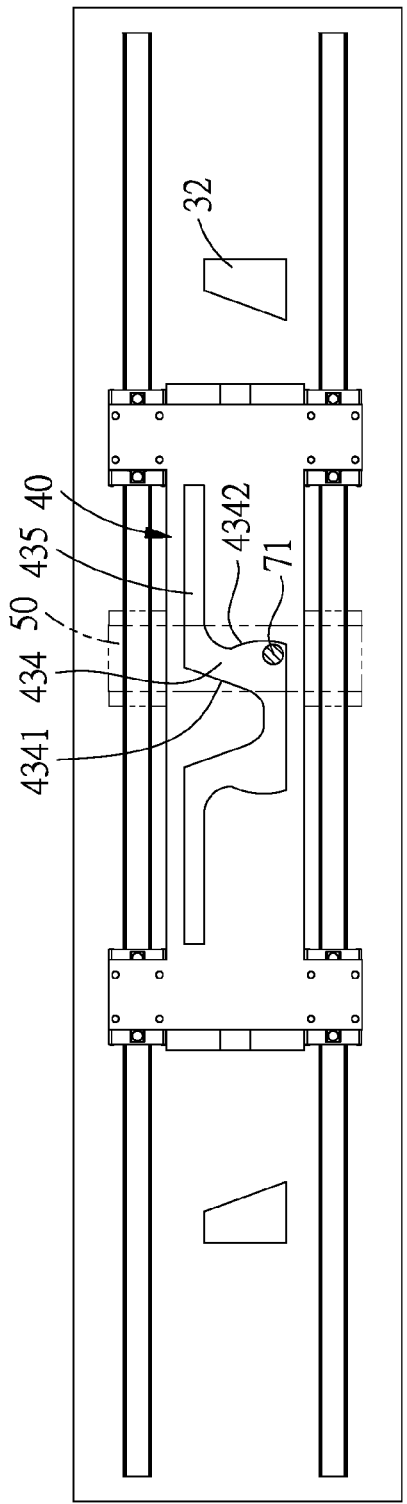

SUPPORT STRUCTURE FOR A BALL SCREW

BACKGROUND OF THE INVENTION

1. Field of the Invention

The present invention relates to a ball screw, and more particularly to a support structure for a ball screw.

2. Description of the Prior Art

A motion transmission apparatus used on a machine tool normally comprises a screw and a nut movably disposed on the screw. When the nut moves, the object carried by the nut also moves simultaneously with the nut. To prevent sagging of the screw, when the screw is excessively long, the motion transmission apparatus is usually provided with a supporter to support the screw, so that the nut is able to move along the same center line, preventing wear off, temperature rise, and structural deformation, meanwhile, extending the travel length of the nut.

As shown in FIG. 1, an actuator for a ball screw disclosed in U.S. Pat. No. 5,720,202 essentially comprises a rail 12 disposed beside a screw 11, and three support brackets 13 slidably mounted on the rail 12 and the screw 11. The support brackets 13 are controlled to move in an accelerated or decelerated manner by belts 14, 15 and pulleys 16, 17, 18 and 19. With the pulleys, the support brackets 13 can change moving direction and speed to support the screw 11, and to prevent the screw 11 from deformation. However, the structure of this actuator is too complicated, and the portions of the belts 14, 15 for contacting the pulleys 16, 17, 18 and 19 are likely to wear off, causing fatigue or fracture of the belts 14, 15. Therefore, the actuator has low reliability and high maintenance cost.

The present invention has arisen to mitigate and/or obviate the afore-described disadvantages.

SUMMARY OF THE INVENTION

The primary objective of the present invention is to provide a support structure for a ball screw which has a simple structure and low maintenance cost.

Another objective of the present invention is to provide a support structure for a ball screw which has a longer service life.

To achieve the above objectives, a support structure for a ball screw in accordance with the present invention comprises: a base, two pivot seats, a screw, at least one guide rail, a first guide block, a second guide block, a support seat, a nut unit and a drive assembly. The pivot seats are mounted on the base and located a distance from each other. The screw is disposed between the two pivot seats. The at least one guide rail is fixed on the base and located one side of the screw. The first guide block is fixed on the base and located between the two pivot seats, and provided with a first slanting surface. The second guide block is fixed on the base, located between the two pivot seats, and provided with a second slanting surface located toward the first slanting surface. The support seat is slidably mounted on the guide rails and located below the screw, the support seat includes a base portion located above the first and second guide blocks, at least one support fork portion located on the base portion to support the screw, and a slot formed in the base portion, the slot includes a first transverse section, a first engaging section connected to the transverse section and located corresponding to the first slanting surface, a connecting section connected to the first engaging section and located corresponding to the first and second slanting surfaces, a second engaging section connected to the connecting section and located corresponding to the second slanting surface, and a second transverse section connected to the second engaging section. The nut unit is sleeved on the screw and slidably disposed on the guide rails, the nut unit is located above the base portion of the support seat and includes a bottom surface located toward the slot. The drive assembly is fixed at a bottom surface of the nut unit and arranged in a direction perpendicular to the screw, the slide block unit including a guide pin which is inserted in the slot and able to slide along the first transverse section, the first engaging section, the connecting section, the second engaging section and the second transverse section, the guide pin is capable of abutting against the first and second engaging sections, and capable of being guided by the first and second slanting surfaces to disengage from the first and second engaging sections.

Preferably, the quantity of the guide rail is two, and the two guide rails are fixed on the base in a manner that the two guide rails are parallel to each other and located at two sides of the screw, and at a bottom of the support seat are provided two support slide blocks slidably mounted on the two guide rails.

Preferably, the first engaging section includes a first inner surface, and a first engaging surface located opposite the first inner surface and concaved toward the first transverse section, and the second engaging section includes a second inner surface, and a second engaging surface located opposite the second inner surface and concaved toward the second engaging section.

Preferably, the first transverse section of the support seat is provided with a first transverse outer surface connected to the first inner surface, and a first transverse inner surface parallel to the first transverse outer surface and connected to the first engaging surface, the connecting section includes a first connecting inner surface connected to the first and second inner surfaces, and a second connecting inner surface parallel to the first transverse outer surface and connected to the first and second engaging surfaces, the second transverse section includes a second transverse outer surface parallel to the second connecting inner surface, leveled with the first transverse outer surface, and connected to the second inner surface, and a second transverse inner surface parallel to the second transverse outer surface and connected to the second engaging surface, and a shortest distance between the first transverse outer and inner surfaces, a shortest distance between the first inner surface and the first engaging surface, a shortest distance between the first and second connecting inner surfaces, a shortest distance between the second inner surface and the second engaging surface, and a shortest distance between the second transverse outer and inner surfaces are all larger than a diameter of the guide pin of the slide block unit.

Preferably, the first guide block further includes a first lateral surface connected to one end of the first slanting surface, and a second lateral surface connected to another end of the first slanting surface, the second guide block further includes a third lateral side connected to one end of the second slanting surface, and a fourth lateral surface connected to another end of the second slanting surface, a perpendicular distance between the first and second lateral surfaces is equal to a perpendicular distance between the third and fourth lateral surfaces, and is equal to or less than a perpendicular distance between the first transverse inner surface and the second connecting inner surface, and is equal to or less than a perpendicular distance between the first engaging surface and the second connecting inner surface.

Preferably, an angle between the first slanting surface and the second lateral surface of the first guide block is equal to an angle between the second slanting surface and the fourth lateral surface of the second guide block, and is equal to or less than an angle between the first inner surface and the second connecting inner surface, and is equal to or less than an angle between the second inner surface and the second connecting inner surface.

Preferably, the angle between the first slanting surface and the second lateral surface of the first guide block, and the angle between the first inner surface and the second connecting inner surface range from 1 to 89 degrees.

Preferably, the angle between the first slanting surface and the second lateral surface of the first guide block, and the angle between the first inner surface and the second connecting inner surface range from 20-70 degrees.

Preferably, two nut slide blocks are provided at two sides of the bottom surface of the nut unit and slidably mounted on the guide rails.

Preferably, the drive assembly includes a slide rail and a slide block unit, the slide rail is fixed at the bottom surface of the nut unit and arranged in a direction perpendicular to the screw, and the slide block unit is slidably disposed on the slide rail and includes a guide pin which is inserted in the slot.

BRIEF DESCRIPTION OF THE DRAWINGS

FIG. 6 is an operational view of the support structure for a ball screw in accordance with the present invention, showing that the guide pin is abutted against the first engaging section;

FIG. 7 is an operational view of the support structure for a ball screw in accordance with the present invention, showing that the guide pin is guided by the first slanting surface to move out of the first engaging section and into the first transverse section;

FIG. 8 is an operational view of the support structure for a ball screw in accordance with the present invention, showing that the guide pin is abutted against the second engaging section and doesn't drive the support seat to move toward the second guide block;

FIG. 9 is an operational view of the support structure for a ball screw in accordance with the present invention, showing that the guide pin is abutted against the second engaging section and drives the support seat to move toward the second guide block;

DETAILED DESCRIPTION OF THE PREFERRED EMBODIMENTS

Figure 1:
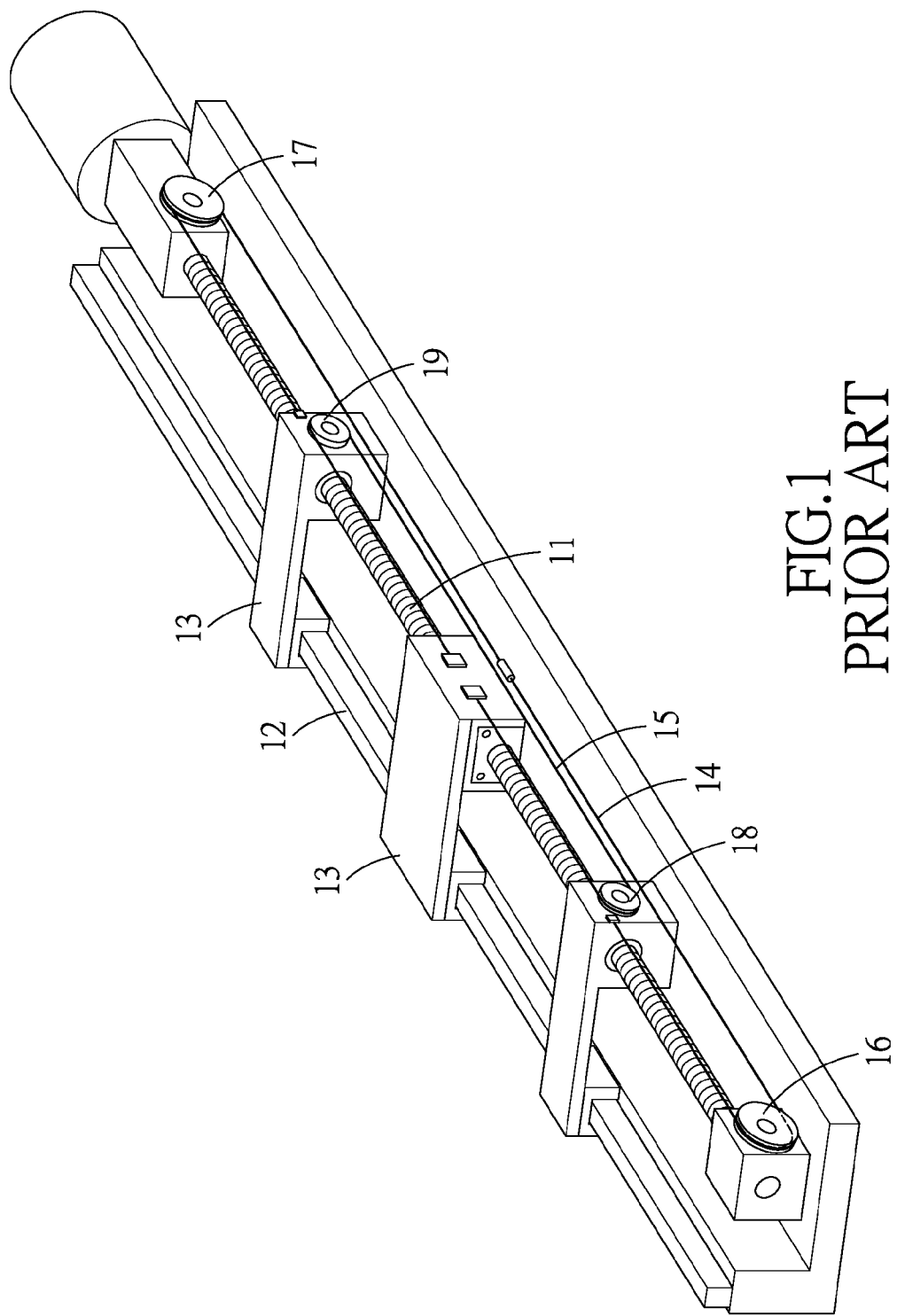
FIG. 1 shows a conventional support structure for a ball screw.
Figure 2:
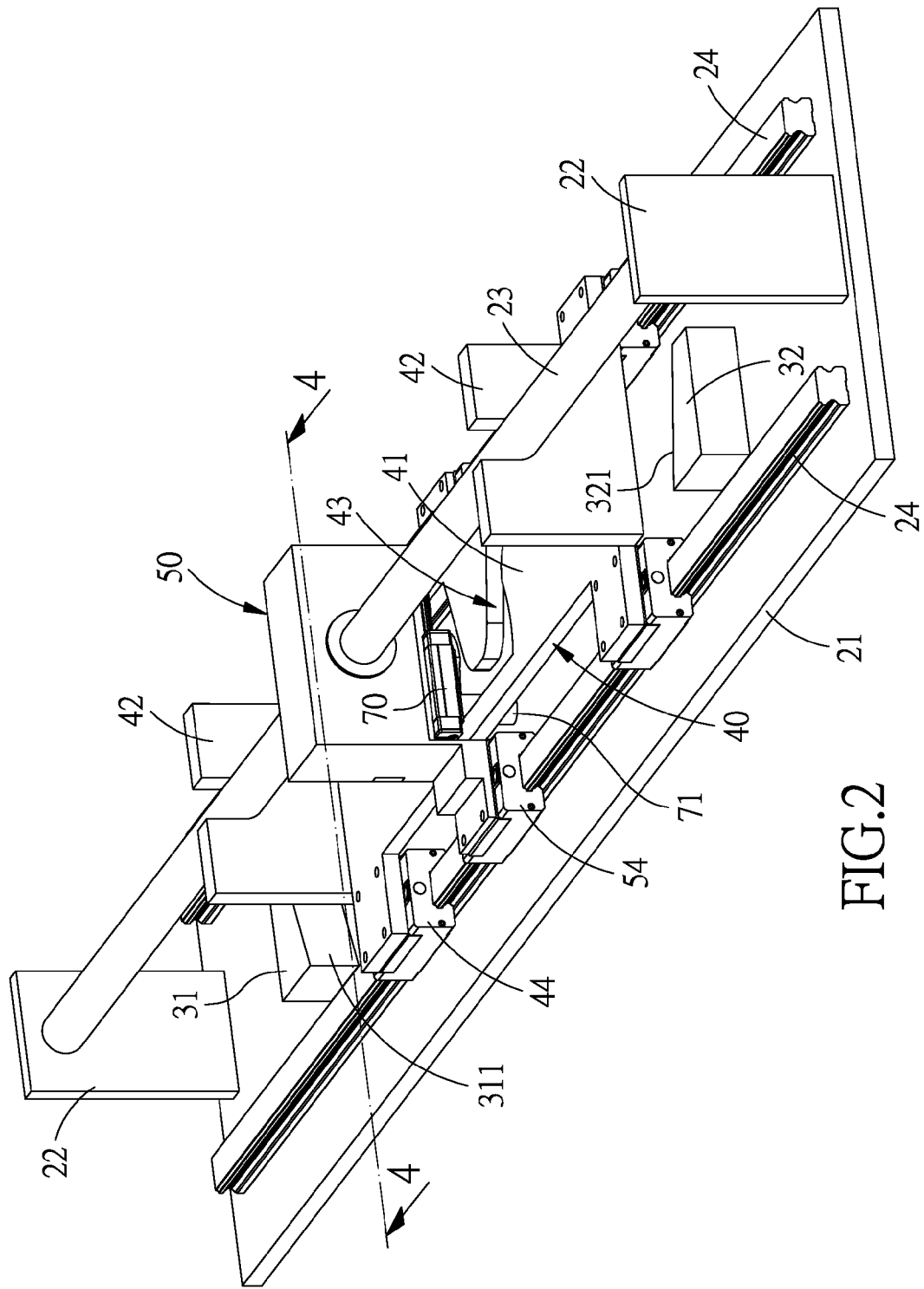
FIG. 2 is a perspective view of a support structure for a ball screw in accordance with the present invention.
Figure 3:
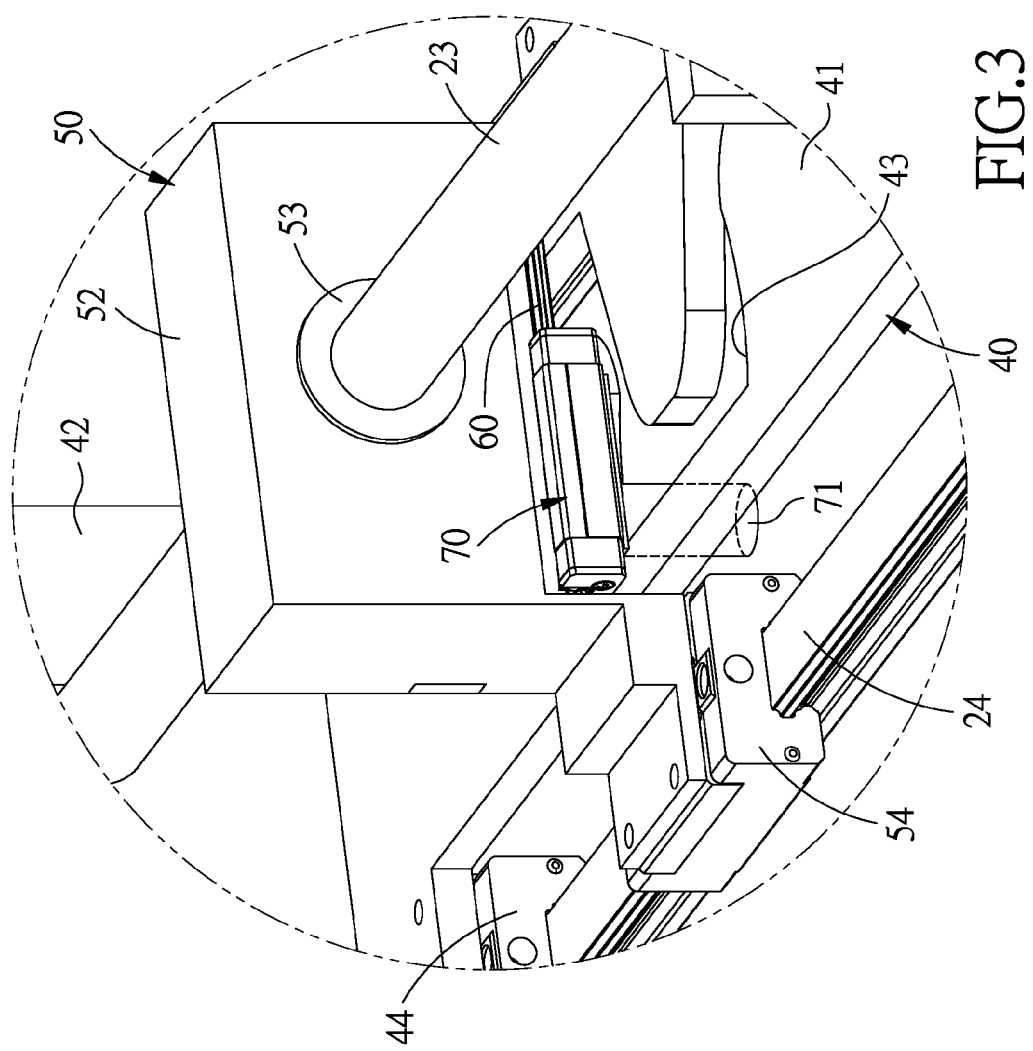
FIG. 3 is an enlarged view of a part of FIG. 2.
Figure 4:
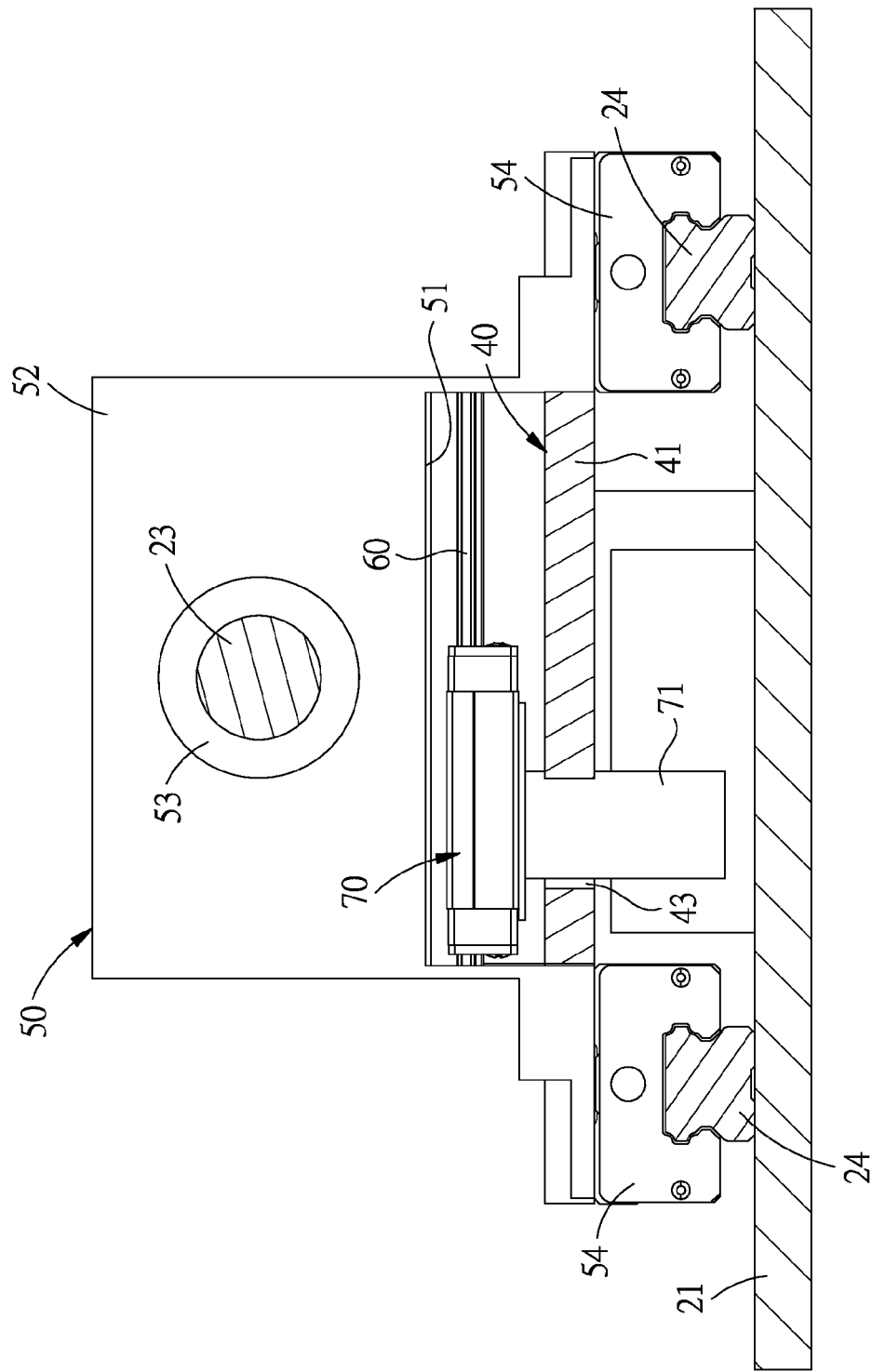
FIG. 4 is a cross sectional view taken along the line 4-4 of FIG. 2.

The present invention will be clearer from the following description when viewed together with the accompanying drawings, which show, for purpose of illustrations only, the preferred embodiment in accordance with the present invention.

Referring to FIGS. 2-6, a support structure for a ball screw in accordance with the present invention comprises: a base 21, two pivot seats 22, a screw 23, two guide rails 24, a first guide block 31, a second guide block 32, a support seat 40, a nut unit 50, and a drive assembly.

The two pivot seats 22 are mounted on the base 21 and located a distance from each other.

The screw 23 is disposed between the two pivot seats 22.

The two guide rails 24 are fixed on the base 21 in a manner that the two guide rails 24 are parallel to each other and located at two sides of the screw 23.

The first guide block 31 is fixed on the base 21 and located between the two pivot seats 22, and provided with a first slanting surface 311. In this embodiment, the first guide block 31 is located between the two guide rails 24 and below the screw 23.

The second guide block 32 is fixed on the base 21, located between the two pivot seats 22, and provided with a second slanting surface 321 located toward the first slanting surface 311. In this embodiment, the second guide block 32 is located between the two guide rails 24 and below the screw 23, and the second guide block 32 is located a distance from the first guide block 31.

The support seat 40 is slidably mounted on the guide rails 24 and located below the screw 23. The support seat 40 includes a base portion 41 located above the first and second guide blocks 31, 32, two support fork portions 42 located on the base portion 41 to support the screw 23, and a slot 43 formed in the base portion 41 and located between the two support fork portions 42. The slot 43 includes a first transverse section 431, a first engaging section 432 connected to the first transverse section 431 and located corresponding to the first slanting surface 311, a connecting section 433 connected to the first engaging section 432 and located corresponding to the first and second slanting surfaces 311, 321, a second engaging section 434 connected to the connecting section 433 and located corresponding to the second slanting surface 321, and a second transverse section 435 connected to the second engaging section 434. In this embodiment, at the bottom of the support seat 40 are provided two support slide blocks 44 slidably mounted on the two guide rails 24. The first engaging section 432 includes a first inner surface 4321, and a first engaging surface 4322 located opposite the first inner surface 4321 and concaved toward the first transverse section 431. The second engaging section 434 includes a second inner surface 4341, and a second engaging surface 4342 located opposite the second inner surface 4341 and concaved toward the second transverse section 435.

The nut unit 50 is sleeved on the screw 23 and slidably disposed on the guide rails 24. The nut unit 50 is located above the base portion 41 of the support seat 40 and includes a bottom surface 51 located toward the slot 43. In this embodiment, the nut unit 50 includes a nut 53 which is disposed in a nut holder 52 and sleeved on the screw 23. The way that the nut 53 and the screw 23 are assembled and operated is the same as the prior art, therefore, further descriptions would be omitted. It is to be noted that at two sides of the bottom surface 51 of the nut unit 50 are provided two nut slide blocks 54 slidably mounted on the guide rails 24.

The drive assembly includes a slide rail 60 and a slide block unit 70. The slide rail 60 is fixed at the bottom surface 51 of the nut unit 50 and arranged in a direction perpendicular to the screw 23. The slide block unit 70 is slidably disposed on the slide rail 60 and includes a guide pin 71 which is inserted in the slot 43 and able to slide along the first transverse section 431, the first engaging section 432, the connecting section 433, the second engaging section 434 and the second transverse section 435. The guide pin 71 is capable of abutting against the first and second engaging sections 432, 434, and capable of being guided by the first and second slanting surfaces 311, 321 to disengage from the first and second engaging sections 432, 434. In this embodiment, when the guide pin 71 is abutted against the first engaging section 432, it means that the guide pin 71 moves toward the first guide block 31 by sliding against the first engaging surface 4322, when the guide pin 71 is abutted against the first engaging surface 4322, it means that the guide pin 71 moves toward the second guide block 32 by sliding against the second engaging surface 4342.

Figure 10:
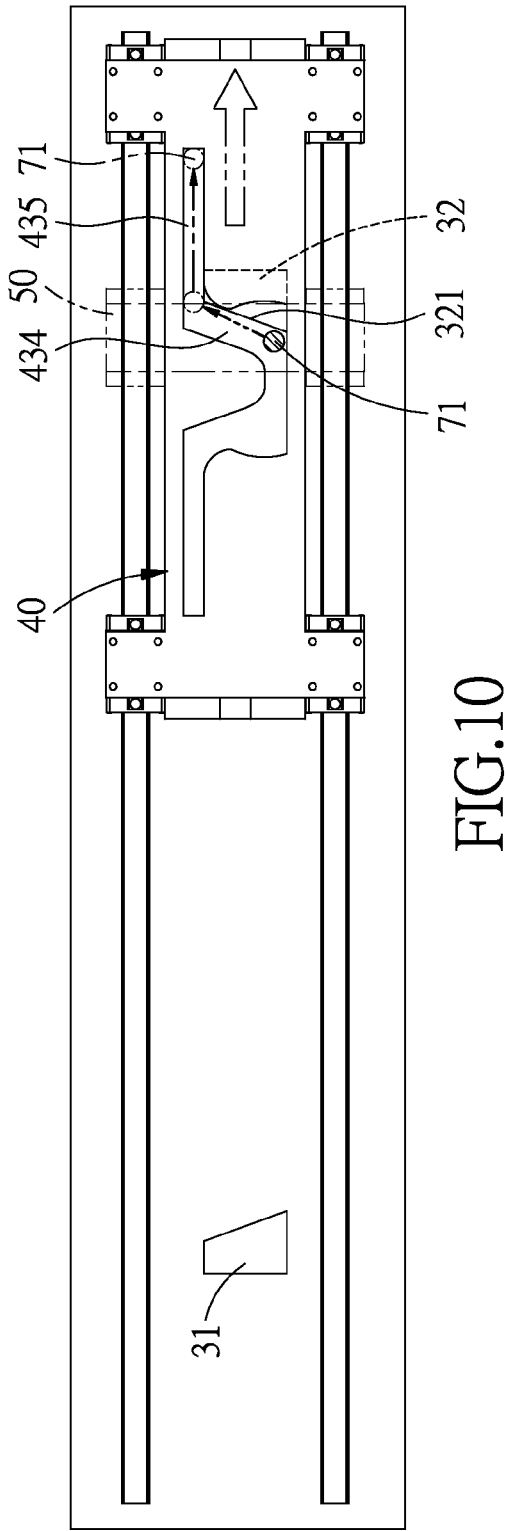
FIG. 10 is an operational view of the support structure for a ball screw in accordance with the present invention, showing that the guide pin is guided by the second slanting surface to move out of the second engaging section and into the second transverse section.

Referring then to FIGS. 6 and 7, when the guide pin 71 is located in the first engaging section 432, the nut unit 50 can drive the support seat 40 to move toward the first guide block 31. When the first engaging section 432 is moved to the first slanting surface 311 of the first guide block 31, the guide pin 71 will be guided by the first slanting surface 311 to slide out of the first engaging section 432 and into the first transverse section 431. As shown in FIGS. 8-10, when the guide pin 71 is located in the second engaging section 434, the nut unit 50 can drive the support seat 40 to move toward the second guide block 32. When the second slanting surface 321 of the second guide block 32 is located in the second engaging section 434, the guide pin 71 will be guided by the second slanting surface 321 to move out of the second engaging section 434 and into the second transverse section 435.

Referring then to FIG. 6, when the nut unit 50 moves toward the first guide block 31, it will drive the guide pin 71 to move toward the first guide block 31. At this moment, the support seat 40 won't move until the guide pin 71 is abutted against the first engaging surface 4322 of the first engaging section 432 of the support seat 40. Since the first engaging surface 4322 is located opposite the first inner surface 4321 and concaved toward the first transverse section 431, and the direction in which the first engaging surface 4322 is formed is different from the moving direction of the guide pin 71, the support seat 40 will be driven by the nut unit 50 to move toward the first guide block 31 to support the screw 23, so as to prevent vibration and deformation of the screw 23.

Referring then to FIG. 7, when the nut unit 50 continues to drive the support seat 40 to move toward the first guide block 31 until the first slanting surface 311 of the first guide block 31 is located in the first engaging section 432, the guide pin 71 will move out of the first engaging section 432 and into the first transverse section 431 by sliding against the first slanting surface 311 until the guide pin 71 is stopped against the closed end of the first transverse section 431.

Referring then to FIGS. 8 and 9, when moving toward the second guide block 32, the nut unit 50 will simultaneously drive the guide pin 71 toward the second guide block 32. At this moment, the support seat 40 won't move, the guide pin 71 will slide from the first transverse section 431 to the first engaging section 432, and then the guide pin 71 will continue to slide through the connecting section 433 by sliding against the first inner surface 4321 of the first engaging section 432 until it is abutted against the second engaging surface 4342 of the second engaging section 434 of the support seat. Since the second engaging surface 4342 is located opposite the second inner surface 4341 and concaved toward the second engaging section 435, and the direction in which the second engaging surface 4342 is formed is different from the moving direction of the guide pin 71, the support seat 40 will be driven by the nut unit 50 to move toward the second guide block 31 to support the screw 23, so as to prevent vibration and deformation of the screw 23.

Referring then to FIG. 10, when the nut unit 50 continues to drive the support seat 40 to move toward the second guide block 32 until the second slanting surface 311 of the second guide block 32 is located in the second engaging section 434, the guide pin 71 will move out of the second engaging section 434 and into the second transverse section 435 by sliding against the second slanting surface 321 until the guide pin 71 is stopped against the closed end of the second transverse section 435.

Figure 11:
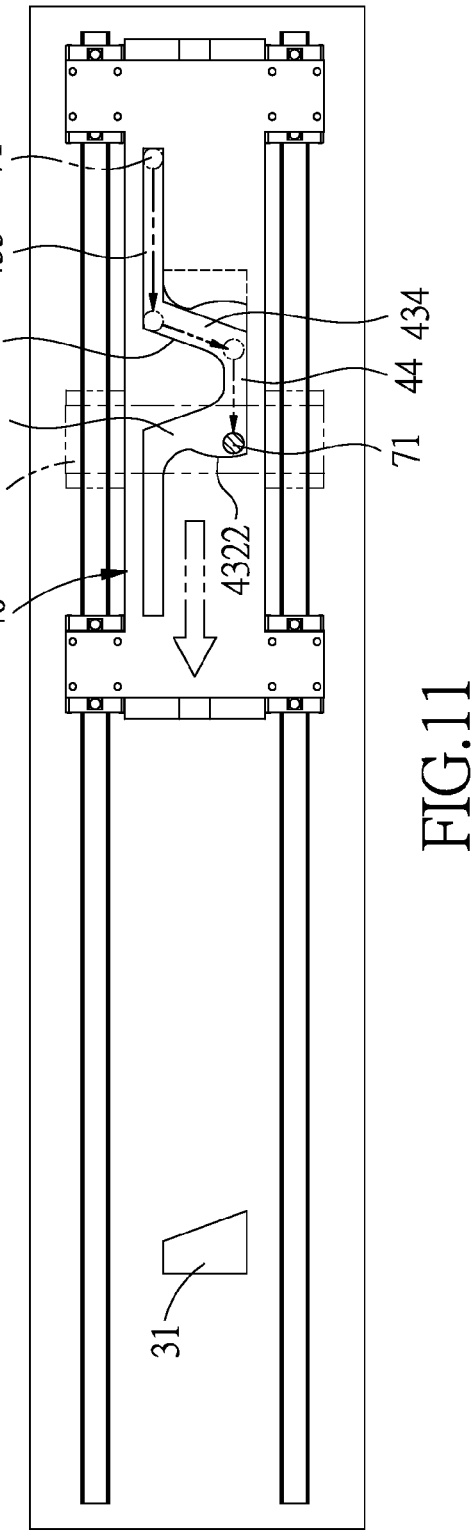
FIG. 11 is an operational view of the support structure for a ball screw in accordance with the present invention, showing that the guide pin is abutted against the second engaging section and doesn't drive the support seat to move toward the first guide block.

Referring then to FIG. 11, when moving away from the first guide block 31, the nut unit 50 will simultaneously drive the guide pin 71 away from the first guide block 31. At this moment, the support seat 40 won't move, the guide pin 71 will slide from the second transverse section 435 to the second engaging section 434, and then the guide pin 71 will continue to slide through the connecting section 433 by sliding against the first inner surface 4321 of the first engaging section 432 until it is abutted against the first engaging surface 4322 of the first engaging section 432 of the support seat 40. Therefore, the support structure for a ball screw of the present invention returns back to the state as shown in FIG. 6.

In addition to the advantage that the support structure of the present invention is capable of preventing sagging and deformation of the screw 23, the nut unit 50 has the freedom to move a certain distance with respect to the support seat 40, namely, within a certain travel distance, the movement of the nut unit 50 doesn't cause the support seat 40 to move, and the travel distance of the unit nit 50 is not limited by the support seat 40. Therefore, the nut unit 50 has a longer travel distance. Besides, the support structure of the present invention has a simple structure, a low reliability and high maintenance cost, since it doesn't require the use of pulley and belt.

Figure 5:
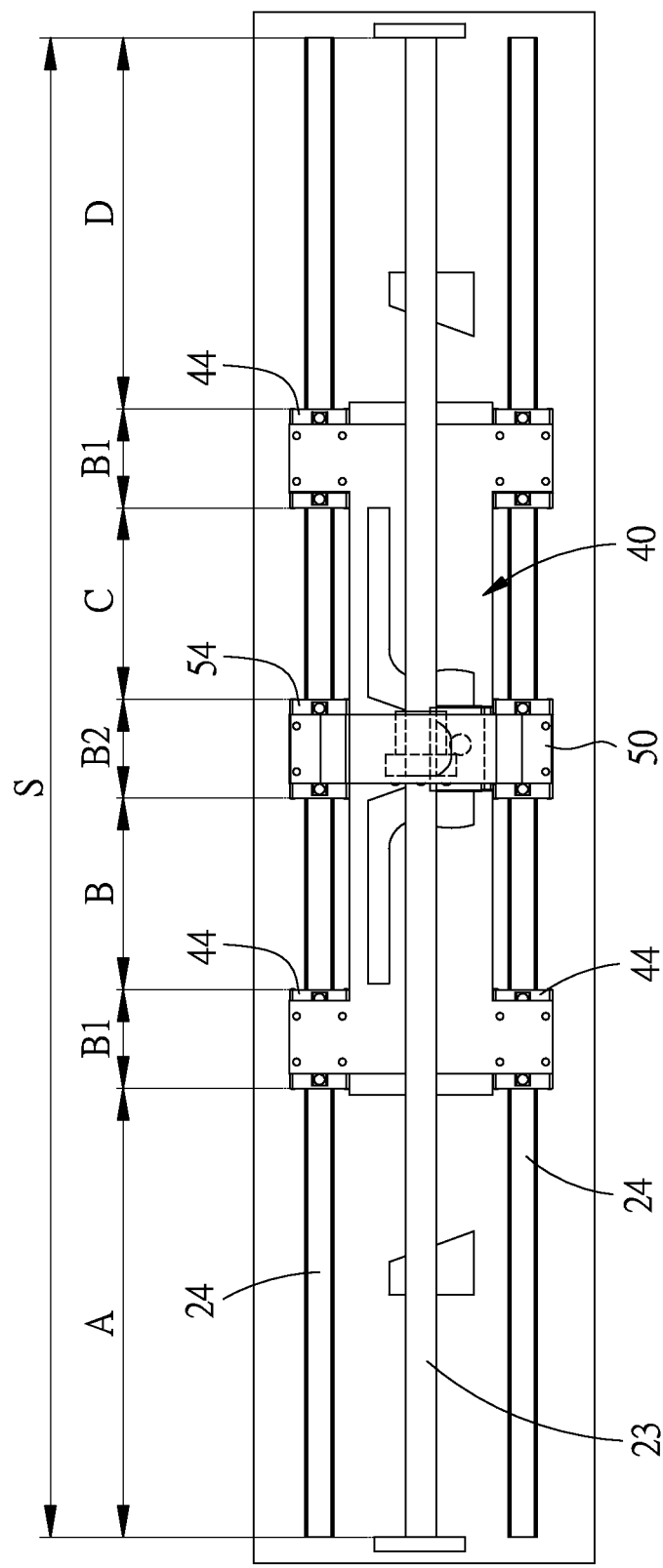
FIG. 5 is a top view of the support structure for a ball screw in accordance with the present invention.

It is to be noted that, as shown in FIG. 5, the length of the screw 23 is S and equal to the length of the two guide rails 24, the length of the support slide blocks 44 two support slide blocks 44 is B1, and the length of the nut slide blocks 54 is B2. If there is no such support seat 40, the length of the screw 23 is still S, and there will be many suspending distances (which refers to the suspending portions of the guide rails 24 supported with nothing) A, B, C and D after the length S of the screw 23 deducts double length B1, of the support slide blocks 44 and the length B2 of the nut slide blocks 54. Therefore, the travel distance of the nut unit 50 is equal to the sum of the suspending distances A, B, C and D.

When the nut unit 50 moves to the middle of the travel length, the suspending distance B of the guide rails 24 is equal to the suspending distance C, so that the nut unit 50 can still move a distance (which equals the sum of the suspending distances B and C of the guide rails 24) even when it moves to the left or right end of the support seat 40. Therefore, the support structure of the present invention still provides same support even when the nut unit moves to the middle of the travel length, so as to reduce the vibration caused when the nut unit 50 moves, and extend the life of the ball screw.

Figure 12:
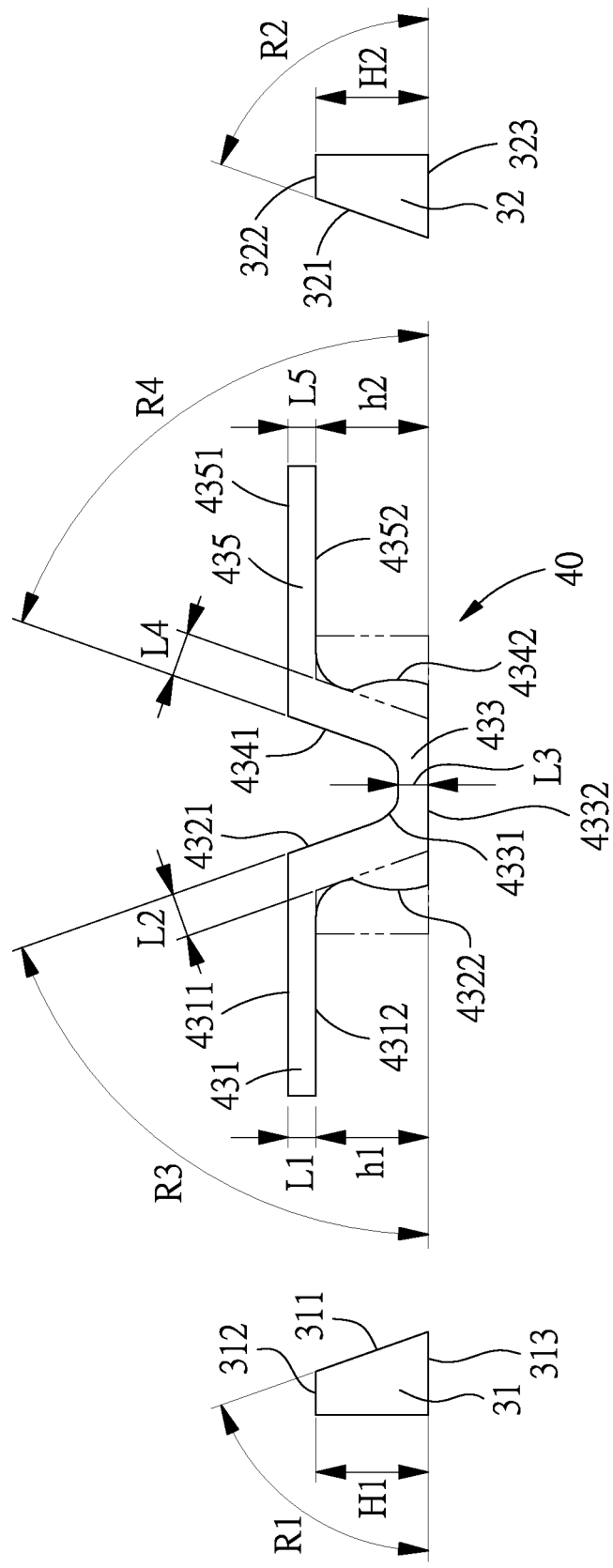
FIG. 12 is a top view showing the relation between the first and second guide blocks and the slot of the support seat.

As shown in FIGS. 6 and 12, the present invention processes the following advantages: the first transverse section 431 of the support seat 40 is provided with a first transverse outer surface 4311 connected to the first inner surface 4321, and a first transverse inner surface 4312 parallel to the first transverse outer surface 4311 and connected to the first engaging surface 4322. The connecting section 433 includes a first connecting inner surface 4331 connected to the first and second inner surfaces 4321, 4341, and a second connecting inner surface 4332 parallel to the first transverse outer surface 4311 and connected to the first and second engaging surfaces 4322, 4342. The second transverse section 435 includes a second transverse outer surface 4351 parallel to the second connecting inner surface 4332, leveled with the first transverse outer surface 4311, and connected to the second inner surface 4341, and a second transverse inner surface 4352 parallel to the second transverse outer surface 4351 and connected to the second engaging surface 4342. The shortest distance L1 between the first transverse outer and inner surfaces 4311, 4312, the shortest distance L2 between the first inner surface 4321 and the first engaging surface 4322, the shortest distance L3 between the first and second connecting inner surfaces 4331, 4332, the shortest distance L4 between the second inner surface 4341 and the second engaging surface 4342, and the shortest distance L5 between the second transverse outer and inner surfaces 4351, 4352 are all larger than the diameter 711 of the guide pin 71 of the slide block unit 70.

The first guide block 31 further includes a first lateral surface 312 connected to one end of the first slanting surface 311, and a second lateral surface 313 connected to another end of the first slanting surface 311. The second guide block 32 further includes a third lateral surface 322 connected to one end of the second slanting surface 321, and a fourth lateral surface 323 connected to another end of the second slanting surface 321. A perpendicular distance H1 between the first and second lateral surfaces 312, 313 is equal to a perpendicular distance H2 between the third and fourth lateral surfaces 322, 323, and is equal to or less than a perpendicular distance h1 between the first transverse inner surface 4312 and the second connecting inner surface 4332, and is equal to or less than a perpendicular distance h2 between the first engaging surface 4322 and the second connecting inner surface 4332.

An angle R1 between the first slanting surface 311 and the second lateral surface 313 of the first guide block 31 is equal to an angle R2 between the second slanting surface 321 and the fourth lateral surface 323 of the second guide block 32, equal to or less than an angle R3 between the first inner surface 4321 and the second connecting inner surface 4332, and equal to or less than an angle R4 between the second inner surface 4341 and the second connecting inner surface 4332. The angle R1 and the angle R3 range from 1 to 89 degrees, and preferably 20-70 degrees. In this embodiment, the angles R1, R3 are 70 degrees.

While we have shown and described various embodiments in accordance with the present invention, it is clear to those skilled in the art that further embodiments may be made without departing from the scope of the present invention.

What is claimed is:

1. A support structure for a ball screw comprising:
   a base;
   two pivot seats mounted on the base and located a distance from each other;
   a screw disposed between the two pivot seats;
   at least one guide rail fixed on the base and located one side of the screw;
   a first guide block fixed on the base and located between the two pivot seats, and provided with a first slanting surface;
   a second guide block fixed on the base, located between the two pivot seats, and provided with a second slanting surface located toward the first slanting surface;
   a support seat slidably mounted on the guide rails and located below the screw, the support seat including a base portion located above the first and second guide blocks, at least one support fork portion located on the base portion to support the screw, and a slot formed in the base portion, the slot including a first transverse section, a first engaging section connected to the transverse section and located corresponding to the first slanting surface, a connecting section connected to the first engaging section and located corresponding to the first and second slanting surfaces, a second engaging section connected to the connecting section and located corresponding to the second slanting surface, and a second transverse section connected to the second engaging section;
   a nut unit sleeved on the screw and slidably disposed on the guide rails, the nut unit being located above the base portion of the support seat and including a bottom surface located toward the slot;
   a drive assembly fixed at the bottom surface of the nut unit and arranged in a direction perpendicular to the screw, a slide block unit including a guide pin which is inserted in the slot and able to slide along the first transverse section, the first engaging section, the connecting section, the second engaging section and the second transverse section, the guide pin being capable of abutting against the first and second engaging sections, and capable of being guided by the first and second slanting surfaces to disengage from the first and second engaging sections.

2. The support structure for a ball screw as claimed in claim 1, wherein the quantity of the guide rail is two, and the two guide rails are fixed on the base in a manner that the two guide rails are parallel to each other and located at two sides of the screw, and at a bottom of the support seat are provided two support slide blocks slidably mounted on the two guide rails.

3. The support structure for a ball screw as claimed in claim 2, wherein two nut slide blocks are provided at two sides of the bottom surface of the nut unit and slidably mounted on the guide rails.

4. The support structure for a ball screw as claimed in claim 1, wherein the first engaging section includes a first inner surface, and a first engaging surface located opposite the first inner surface and concaved toward the first transverse section, and the second engaging section includes a second inner surface, and a second engaging surface located opposite the second inner surface and concaved toward the second engaging section.

5. The support structure for a ball screw as claimed in claim 4, wherein the first transverse section of the support seat is provided with a first transverse outer surface connected to the first inner surface, and a first transverse inner surface parallel to the first transverse outer surface and connected to the first engaging surface, the connecting section includes a first connecting inner surface connected to the first and second inner surfaces, and a second connecting inner surface parallel to the first transverse outer surface and connected to the first and second engaging surfaces, the second transverse section includes a second transverse outer surface parallel to the second connecting inner surface, leveled with the first transverse outer surface, and connected to the second inner surface, and a second transverse inner surface parallel to the second transverse outer surface and connected to the second engaging surface, and a shortest distance between the first transverse outer and inner surfaces, a shortest distance between the first inner surface and the first engaging surface, a shortest distance between the first and second connecting inner surfaces, a shortest distance between the second inner surface and the second engaging surface, and a shortest distance between the second transverse outer and inner surfaces are all larger than a diameter of the guide pin of the slide block unit.

6. The support structure for a ball screw as claimed in claim 5, wherein the first guide block further includes a first lateral surface connected to one end of the first slanting surface, and a second lateral surface connected to another end of the first slanting surface, the second guide block further includes a third lateral side connected to one end of the second slanting surface, and a fourth lateral surface connected to another end of the second slanting surface, a perpendicular distance between the first and second lateral surfaces is equal to a perpendicular distance between the third and fourth lateral surfaces, and is equal to or less than a perpendicular distance h1 between the first transverse inner surface and the second connecting inner surface, and is equal to or less than a perpendicular distance between the first engaging surface and the second connecting inner surface.

7. The support structure for a ball screw as claimed in claim 6, wherein an angle between the first slanting surface and the second lateral surface of the first guide block is equal to an angle between the second slanting surface and the fourth lateral surface of the second guide block, and is equal to or less than an angle between the first inner surface and the second connecting inner surface, and is equal to or less than an angle between the second inner surface and the second connecting inner surface.

8. The support structure for a ball screw as claimed in claim 7, wherein the angle between the first slanting surface and the second lateral surface of the first guide block, and the angle between the first inner surface and the second connecting inner surface range from 1 to 89 degrees.

9. The support structure for a ball screw as claimed in claim 8, wherein the angle between the first slanting surface and the second lateral surface of the first guide block, and the angle between the first inner surface and the second connecting inner surface range from 20-70 degrees.

10. The support structure for a ball screw as claimed in claim 2, wherein the drive assembly includes a slide rail and a slide block unit, the slide rail is fixed at the bottom surface of the nut unit and arranged in a direction perpendicular to the screw, and the slide block unit is slidably disposed on the slide rail and includes the guide pin which is inserted in the slot.

* * * * *